United States Patent [19]

Ford et al.

[11] 3,905,103
[45] Sept. 16, 1975

[54] GRASS TRIMMING DEVICE FOR A SPRINKLER

[76] Inventors: Clancy B. Ford, 6651 18th Ave., Sacramento, Calif. 95820; Charles E. Ford, 16901 Schoolcraft St., Van Nuys, Calif. 91406

[22] Filed: Nov. 25, 1974

[21] Appl. No.: 526,454

[52] U.S. Cl. ............... 30/276; 30/287; 30/DIG. 7; 172/13
[51] Int. Cl.² ............... B26B 29/00; A01D 35/26
[58] Field of Search ......... 30/276, 279 R, 287, 300, 30/500, DIG. 7; 172/13

[56] References Cited
UNITED STATES PATENTS

| | | |
|---|---|---|
| 3,062,299 | 11/1962 | Koepfinger ................. 30/287 X |
| 3,174,224 | 3/1965 | Rousselet ................. 30/276 X |
| 3,555,680 | 1/1971 | Ford ................. 30/276 |
| 3,747,213 | 7/1973 | Green ................. 30/279 R |
| 3,747,214 | 7/1973 | Bohlman ................. 30/300 |
| 3,814,189 | 6/1974 | Thompson ................. 172/13 |

*Primary Examiner*—Al Lawrence Smith
*Assistant Examiner*—J. C. Peters
*Attorney, Agent, or Firm*—William I. Beach

[57] ABSTRACT

A device for trimming grass around a sprinkler head has an upright shaft rotatably connected to an outer cup and an inner cup. The outer cup is adapted to engage a lawn and the inner cup a sprinkler head respectively to guide and limit the depth of cut. Cutting blades rotatably connected to the shaft between the two cups are vertically movable in a concentric cutting path around the sprinkler head.

7 Claims, 7 Drawing Figures

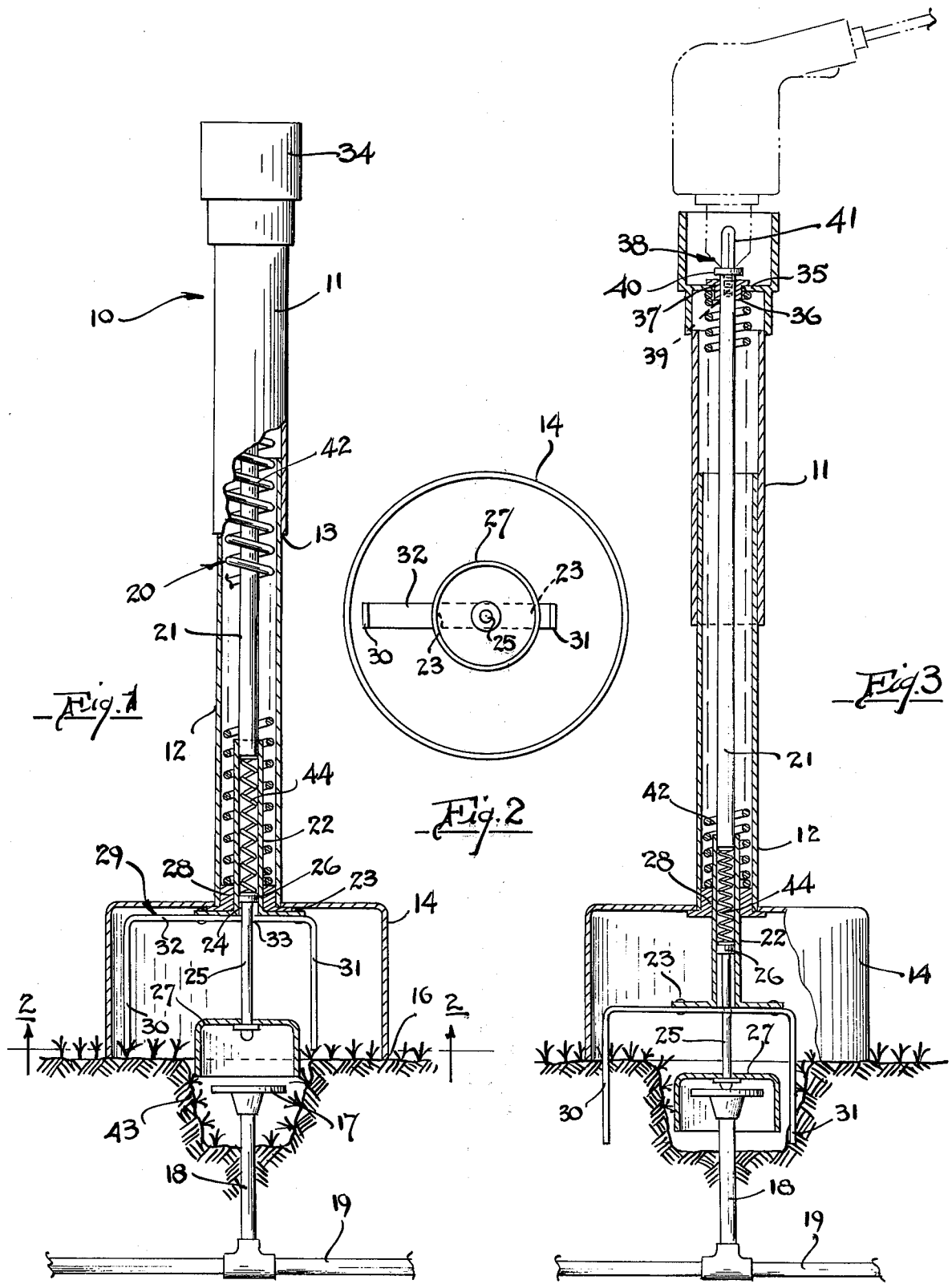

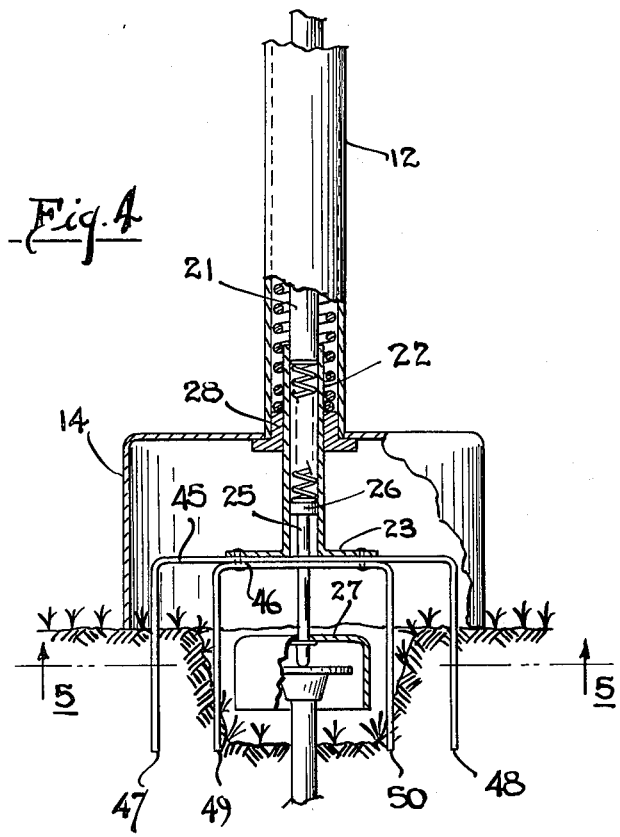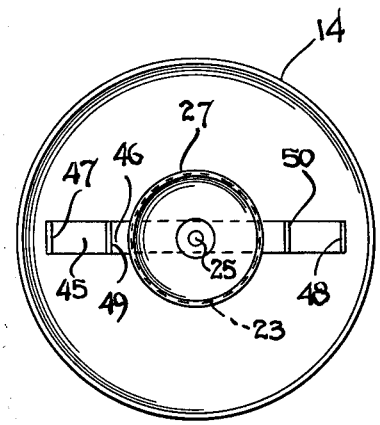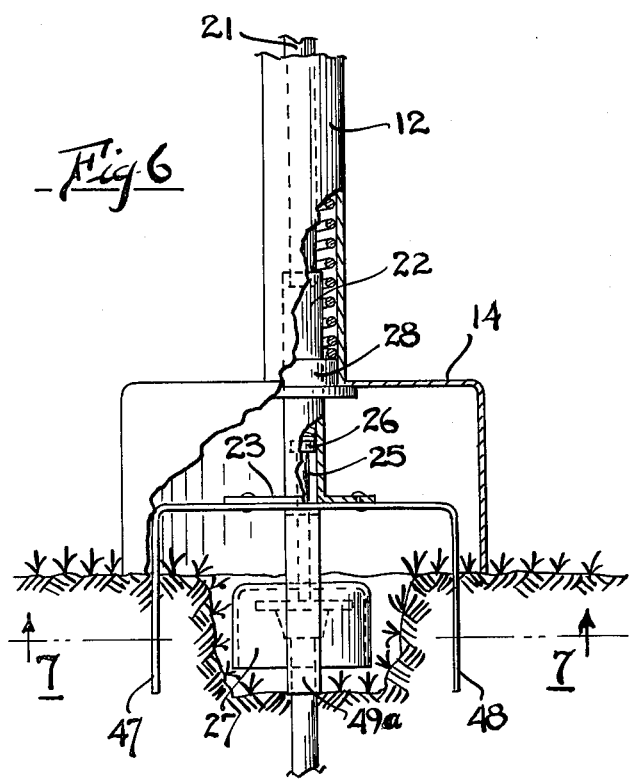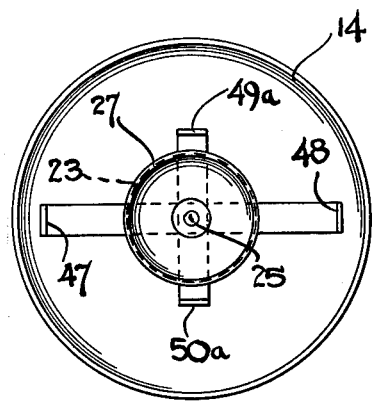

GRASS TRIMMING DEVICE FOR A SPRINKLER

BACKGROUND OF THE INVENTION

1. Field of the Invention

The present invention relates to garden tools such as grass trimmers and more particularly for a power operated tool for cutting grass around a hole-recessed sprinkler head.

2. Description of the Prior Art

The sprinkler systems designed for private and public lawns generally have hole-recessed sprinkler heads for watering the grass. Eventually a certain amount of silt or dirt washes into the sprinkler head hole. Grass tends to spread into the cavity and choke off the spray of water. Since this is a common problem with gardeners the most find the job difficult and tedious to remove grass from around sprinkler heads. Generally, this is done with hand shears or the like.

Because of the aforesaid problem some attempt has been made to provide a rotary blade cutting device to simplify the laborious job of cutting grass around a hole-recessed sprinkler head. Such a device is shown in U.S. Pat. No. 3,747,213, issued to Irving C. Green, et al which supports a rotor on the end of a shaft having laterally extending blades directed downwardly and inwardly towards the sprinkler head. It is suggested that this rotor and blades will cut a cone shaped path of grass. However, since there is mostly grass embedded soil accumulated around the sprinkler head, the blades will obviously undercut the dirt. Therefore, if the dirt is hard packed or, in some cases, wet the blades will tend to act like shovels and place a heavy load on the rotor. Accordingly, it is apparent that under such conditions it would require an excessive amount of power to drive the rotor and hence, to operate effectively.

Another device in this class is shown in U.S. Pat. No. 3,743,027, issued to Cecil T. Hatfield. This device provides a plurality of vertically depending downwardly cutting blades disposed in staggered relationship on a handle between outer and inner cylinders. The blades are obliquely positioned relative to the direction of rotation of the handle. It can be readily seen here that the blades are not designed to cut grass in rotation about a sprinkler head but more particularly to cultivate dirt thereabout. Further, it is evident that a hand turning tool as illustrated in the patent would also require a great deal of manual torque to move such blades through hard packed or wet dirt.

Therefore, it is the object of the present invention to provide a rotatable blade grass trimmer that will solve the aforementioned problem yet which can be readily manufactured with simple but unique cutting means for trimming grass around a sprinkler head.

SUMMARY OF THE INVENTION

In carrying out the principles of the present invention in accordance with a preferred embodiment thereof, a grass trimming device has an elongate upright shaft adapted for rotation about a center longitudinal axis therethrough. The shaft has an extension connected on the lower end thereof comprising a casing having a bore slightly greater than the diameter of the shaft. The device includes centering means comprising a first generally cylindrical downwardly depending cup reciprocally supported on the elongate shaft adjacent the lower end of the casing. The first cup has a center longitudinal axis for vertical registry with a sprinkler head when the first cup embraces the sprinkler head. Mounted on the lower end of the casing are blade means adapted for rotation in a generally cylindrical cutting path about the sprinkler head. A second generally cylindrical downwardly depending cup operationally connected to the elongate shaft is adapted to contact a ground portion above and concentric with a sprinkler head. The second cup is disposed so as to be substantially concentric with and enclose the first cup and blade means. There are bearing means mounted on the second cup for applying lateral restraint to maintain the elongate shaft upright.

BRIEF DESCRIPTION OF THE DRAWING

FIG. 1 is a side elevation view, taken partly in section through a device representing the present invention, FIG. 2 is a cross-sectional view taken along line 2—2 of FIG. 1, FIG. 3 is a cross-sectional view of FIG. 1 in operation of trimming grass around a sprinkler head, FIG. 4 is a partial elevational view in section of the present invention showing a preferred cutting blade arrangement, FIG. 5 is a cross-sectional view taken along line 5—5 of FIG. 4, FIG. 6 is a partial elevational view in section of an alternate cutting blade arrangement, and FIG. 7 is a cross-sectional view taken along line 7—7 of FIG. 6.

DETAILED DESCRIPTION

Referring to FIGS. 1 and 3 it can be seen that the device disclosed consists of a housing 10 having an upper housing 11 slidably overlapping a lower housing 12 at juncture 13. The lower housing 12 centrally connected to outer cylindrical cup 14 is adapted to engage ground portion 16 above and concentric with hole-recessed sprinkler head 17 connected to standpipe 18 of water supply pipe 19. A drive shaft 20 is constructed of an upper solid elongate shaft 21 connected to a lower extension comprising a casing 22 having a bore slightly greater than the diameter of shaft 21. The lower distal end of shaft 21 is secured in the bore at the upper end of casing 22. The lower end of casing 22 is connected to a blade supporting plate 23 which has a central opening 24 smaller than the bore of casing 22. Slidably disposed in opening 24 is a piston head shaft 25 reciprocally contained in the bore of casing 22. The head 26 of shaft 25 is adapted for intimate surface contact with the bore of casing 22. Shaft 25 having a head larger in diameter than opening 24 in plate 23 is stopped from passing therethrough. The lower end of shaft 25 is connected centrally to an inner cylindrical cup 27 which is adapted to embrace sprinkler head 17. Referring to FIG. 3, it is seen that when cup 27 is extended downwardly to engage sprinkler head 17 the lower portion of casing 22 passes through a bushing 28 pressed into opening 15 at the point of connection of housing 12 with outer cup 14. Bushing 28 is adapted to apply lateral restraint to maintain shaft 20 upright. Referring to FIGS. 1 and 3, it is seen that a U-shaped cutter 29 having downwardly depending blades 30 and 31 connected to horizontal flange 32 is attached to plate 23. Cutter 29 is preferably formed of strap metal having high strength and durable properties. An opening 33 is provided in flange 32 to allow shaft 25 to pass upwardly therethrough when cup 27 engages sprinkler head 17 and cutter 29 is rotatably forced downwardly around sprinkler head 17. In this operation blade 30, spaced a distance from head 17, cuts a cylindrical path adjacent to the open edge of cup 14, whereas, blade 31 spaced immediately adjacent to head 17 cuts a cylindrical path thereabout. Together, blades 30 and 31 cut a doughnut-shaped segment of grass embedded soil or dirt.

At the upper end of housing 11 is a cylindrical portion defined as chamber 34 which provides a protective shield for the upper connection of shaft 21 with a source of motor power. Chamber 34 has a lower horizontal wall 35 in which a bushing 36 is pressed in a central opening 37 for rotational support of the upper distal end of shaft 21. Connected to the distal end of shaft 21 is an adapter 38 which has a shank 39 threadly engaged therein, a shoulder flange 40, larger in diameter than opening 37, adapted to press downwardly on wall 35 to securely hold the distal end of shaft 21 thereto and an upper stem 41 arranged to be coupled with a source of power.

An elongate spring 42 surrounding shaft 21 and confined in housing 11 and 12 between wall 35 and lower bushing 28 is adapted for biasing shaft 20 against downward movement thereof to rotatably force cutter 29 and blades 30 and 31 into hole 43 containing sprinkler head 17. Upon the downwardly thrust of shaft 20 a spring 44, considerably less in length than spring 42, disposed in the bore of casing 22 between the lower distal end of shaft 21 and piston head 26 is also adapted for biasing shaft 25 against the upwardly movement thereof when inner cup 27 is forced downwardly to engage sprinkler head 17.

It is to be understood that the present invention is not to be limited to the particular number or location of cutting blades. A preferred arrangement of cutting blades is shown in FIG. 4 which includes cutters 45 and 46 attached in direct alignment to blade supporting plate 23. It is seen that cutter 45 has downwardly depending blades 47 and 48 that are spaced wider apart than the corresponding blades 49 and 50 of cutter 46.

In operation with the above mentioned blade arrangement it was observed that the blades trimmed grass around a sprinkler head effectively and efficiently. Further, it was found unnecessary to sharpen the leading edges of blades 47, 48, 49 and 50 in order to cut through grass and dirt cleanly. As a matter of interest, the blades were sharpened to knife edges and rotatably forced through grass embedded dirt surrounding a sprinkler head. At various periods of time the blades were inspected and found to be progressively blunted.

FIG. 6 illustrates an alternate blade arrangement wherein cutters 45 and 46 are displaced 90° relative to the other. A bottom view of this arrangement is shown in FIG. 7. Although the blade arrangement of FIG. 6 will perform equally as well as that of FIG. 4, the latter is preferred from the standpoint of simplicity of manufacture and assembly.

The unique construction of the present invention lends itself to simple and economical means for assembling the components noted herein. The device illustrated in the drawings may be represented by three sub-assemblies of which the first consists of shaft 21, casing 22, spring 44, shaft 25, plate 23, cutters 45 and 46 and inner cup 27 operationally connected together in one unit. The second sub-assembly consists of housing 12 connected to outer cup 14. The third sub-assembly consists of housing 11 connected to chamber 34. Accordingly, to quickly assemble the sub-assemblies shaft 21 of the first unit is inserted through bushing 28 of the second sub-assembly and extended upwardly until the upper end of shaft protrudes beyond the open end of housing 12. Spring 42 is then slipped over shaft 21 and allowed to fall inside of housing 12 to bring the end thereof in contact with bushing 28 at the lower end of housing 12. The third sub-assembly, housing 11 and chamber 34 is placed over shaft 21, spring 42 as well as the upper end of shaft 12 and pushed downwardly compressing spring 42 within the two housings until the distal end of shaft 21 extends through bushing 36 in wall 35. Thereupon, the shank 39 of adapter 38 is threadly engaged in the distal end of shaft 21 and housing 11 is released to decompress spring 42 allowing wall 35 to return upwardly until flange 40 of adapter 38 contacts wall 35. Following this, the three sub-assemblies are operationally joined together.

In operating the present invention, stem 41 of adapter 38 is connected to a source of power. Then the device of FIGS. 1 and 3 is lowered over sprinkler head 17 to place the open edge of cup 14 on a ground portion concentric with sprinkler head 17. The power source, which may be a portable hand drill, for example, is started to impart rotational movement to shaft 20. Shaft 20 is then thrust downwardly against the bias of spring 42 causing housing 11 to further overlap housing 12 and casing 22 to extend through bushing 28 in housing 11. The extension of casing 22 downwardly forces inner cup 27 in closure with sprinkler head 17 and shaft 22 to move upwardly in casing 22 against the bias of spring 44 whereupon cutters 45 and 46, reference FIG. 4, moves downwardly to bring blades 47, 48, 49 and 50 in rotatably cutting engagement with grass and dirt accumulated around sprinkler head 17.

From the description and illustration of the present invention it is obvious that it provides many important advantages which can be used effectively and efficiently as a grass trimming device for sprinkler heads.

The foregoing description is to be clearly understood to be given by way of illustration and example only, the spirit and scope of the present invention being limited solely by the appended claims.

We claim:

1. A grass-cutting device for trimming around a hole-recessed sprinkler head, which comprises:

an elongate upright shaft adapted for rotation about a center longitudinal axis therethrough, the elongate shaft having an extension connected to the lower end thereof comprising a casing having a bore therein, centering means having a first generally cylindrical downwardly depending cup reciprocally supported on said elongate shaft adjacent the lower end of the casing, the first cup having a center longitudinal axis for vertical registry with a sprinkler head when said first cup embraces the sprinkler head, blade means mounted on the lower end of said casing for rotation with said elongate shaft in a generally cylindrical-shaped cutting path concentric about said sprinkler head, a second generally cylindrical downwardly depending cup operatively connected to said elongate shaft adapted to contact a ground portion above and concentric with said sprinkler head, the second cup being substantially concentric with and enclosing said first cup and the blade means, and bearing means mounted on said second cup for applying lateral restraint to maintain said elongate shaft upright.

2. The device recited in claim 1, wherein the centering means further include:

a second shaft substantially less in length than said elongate shaft, the second shaft being slidably supported in the bore of said casing and having a lower end connected to said first cup.

3. The device recited in claim 2, further including:

movable connection means between said elongate shaft and said second cup for downward movement of said elongate shaft and said blade means relative to said second cup when said second cup contacts the ground portion about said sprinkler head.

4. The device recited in claim 3, further including:

movable connection means between said elongate shaft and said second shaft for upward movement of said second shaft in said casing relative to said first shaft during said contact of said second cup with said ground portion and said first cup with said sprinkler head.

5. The device recited in claim 4, further including:

spring means connected between said elongate shaft and said second cup for biasing said elongate shaft against the downward movement of said elongate shaft.

6. The device recited in claim 5, further including:

spring means connected between said casing and said second shaft for biasing said second shaft against the upward movement of said second shaft.

7. The device recited in claim 6, further including:

a plate horizontally connected to the distal end of said casing having a centrally disposed opening therein for reciprocal movement of said second shaft therethrough, the plate being adapted to hold said blade means for rotation about said sprinkler head.

* * * * *